US006278062B1

United States Patent
Sowdon

(10) Patent No.: US 6,278,062 B1
(45) Date of Patent: Aug. 21, 2001

(54) ARTICLE OF MANUFACTURE FOR A COVER PLATE AND A FACEPLATE WITHOUT FRONTAL SCREWS FOR FLUSH MOUNTED ELECTRICAL OUTLET BOXES INSTALLED WITH SWITCHES OR OUTLET RECEPTACLES

(76) Inventor: Robert C. Sowdon, P.O. Box 533, Kapaa, HI (US) 96746

( * ) Notice: Subject to any disclaimer, the term of this patent is extended or adjusted under 35 U.S.C. 154(b) by 0 days.

(21) Appl. No.: 09/681,104

(22) Filed: Jan. 8, 2001

(51) Int. Cl.[7] ........................................................ H02G 3/14
(52) U.S. Cl. ............................ 174/66; 174/67; 220/241; 220/242
(58) Field of Search ................................... 174/66, 67, 50; D13/156, 152; 220/241, 242, 3.8, 3.92, 4.02; 439/135, 138, 149; D8/353

(56) References Cited

U.S. PATENT DOCUMENTS

| 1,713,101 | * | 3/1929 | Starrett ................................. | 174/66 |
| 3,140,344 | * | 7/1964 | Slater et al. ........................ | 174/67 |
| 4,293,173 | * | 10/1981 | Tricca ................................. | 174/67 X |
| 4,737,599 | * | 4/1988 | Fontaine ............................. | 174/67 |
| 6,188,022 | * | 2/2001 | He ..................................... | 174/58 |

* cited by examiner

Primary Examiner—Dean A. Reichard
Assistant Examiner—Dhiru R Patel

(57) ABSTRACT

An article of manufacture to provide a unique Cover plate with shaped corresponding apertures, composed of galvanized sheet metal for flush mounted Electrical Outlet Boxes, that are installed with various types of Switches, Outlet Receptacles, or combinations thereof. The Cover plate is oversized to position over a single, double or triple electrical outlet box, with corresponding adjusting apertures, adjusting the switch or outlet mounting screws will secure flush to the wall while the cover plate is attached. The Cover plate is the base for a novel Faceplate without frontal screws, which is attached to the Cover plate with hook and latch material. The novel Faceplate composed of injected molded plastic with shaped corresponding apertures, is oversized to provide ample surface area for attaching a graphic cover or applying material for decoration, without distracting screws. The method of attaching with hook and loop material provides easy installation and removal for cleaning, also for exchanging faceplates with other designs for seasonal or other occasions.

1 Claim, 2 Drawing Sheets

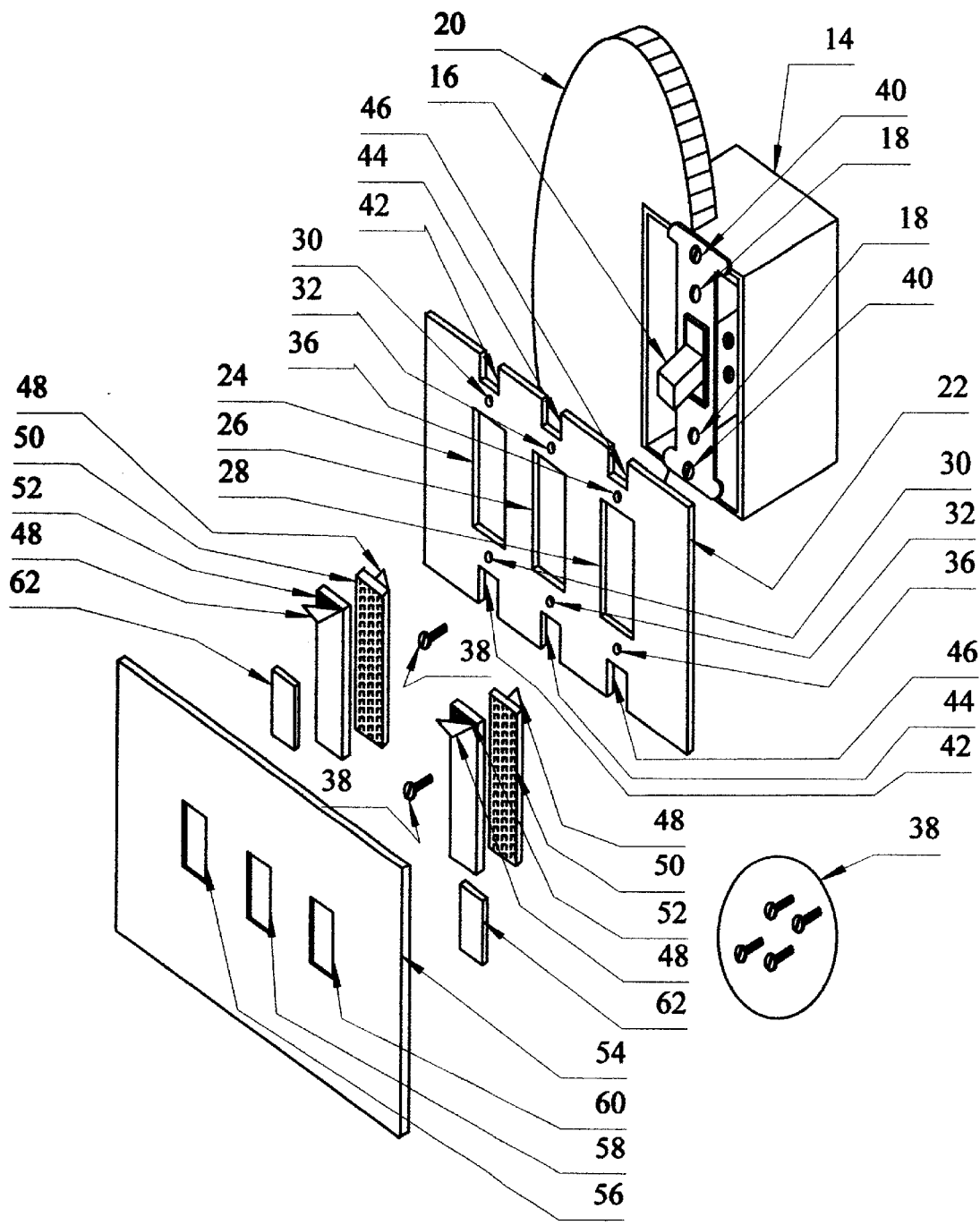
FIGURE ONE

FIGURE TWO
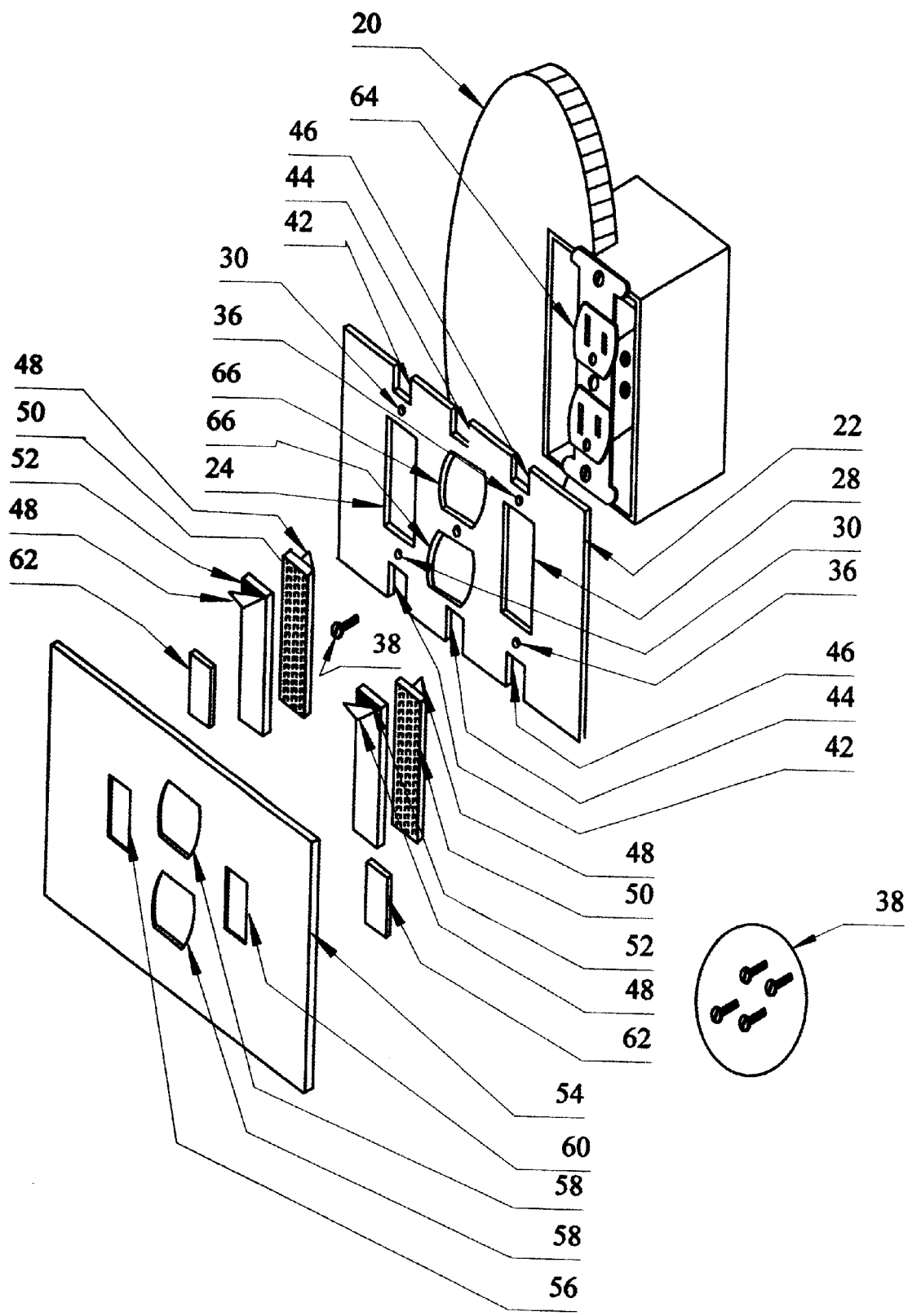

ARTICLE OF MANUFACTURE FOR A COVER PLATE AND A FACEPLATE WITHOUT FRONTAL SCREWS FOR FLUSH MOUNTED ELECTRICAL OUTLET BOXES INSTALLED WITH SWITCHES OR OUTLET RECEPTACLES

BACKGROUND OF INVENTION

1. Field of the Invention

This invention relates generally to the field of Electrical Switches and Outlet receptacles and more particularly to an article of manufacture for a Cover plate and a Faceplate without frontal screws, for flush mounted Electrical Outlet Boxes.

2. Description of the Prior Art

With the invention of electricity and the electric light, came the outlet box mounted on a wall in buildings, installed with various types of switches and outlet receptacles with a cover. People often decorate the covers to add decor to their room by painting or applying materials such as wallpaper or a graphic cover.

Common switch and outlet receptacle covers are manufactured with corresponding apertures for specific applications, attached with frontal screws to the switch or outlet receptacle in an electrical outlet box which is installed flush to the wall. Electrical outlet boxes are installed prior to attaching the rooms exterior wall. In some cases the outlet box is not flush with the wall when installed. The exterior wall, as with wallboard, are cut prior to installing over the outlet box. In some cases the gap is too great for the switch to make contact with the wall and the cover has to fill the gap. Common cover plates for switches an d outlet receptacles are made of plastic material. There is no adjustment to compensate for the gap in the wall. While positioning the cover, when the frontal screws are tightened, the cover may crack.

Common Cover plates for switches and outlet receptacles are standard in size, and have frontal mounting screws. When applying a graphic cover, the surface area is limited for viewing and the screws distract from the design. Also frontal screws will rust corroding the switch or outlet receptacle and discolor Cover plates in humid climates, such as Hawaii.

SUMMARY OF INVENTION

The primary object of the invention is to provide an improved Cover plate for flush mounted electrical outlet boxes, that is attached with screws, to the installed switch or outlet receptacle and covers exposed wiring.

Another object is to provide a unique Cover plate, shaped with corresponding apertures, to position over single, double or triple electrical outlet boxes installed with various types of switches or outlet receptacles and or combinations thereof.

Still another object is to provide a novel oversized Cover plate shaped with corresponding adjusting apertures for the switch or outlet mounting screws, which secures flush to the wall when attached, the Cover plate, switch and or outlet receptacles.

A further object is to provide a Cover plate, which is a base for a unique Faceplate without frontal mounting screws, that rust, corroding the switch or outlet receptacle in humid climates, such as Hawaii.

Yet, another object of the invention is to provide an oversized Faceplate for attaching a graphic cover or materials applied to the surface for decoration.

Still yet another object is to provide a Faceplate without frontal screws that distract from, or has to be designed around, or included in a decorative design covering.

Another object is to provide a Faceplate that is attached or removed easily from the cover plate, using hook and loop material. Faceplates may be easily changed for seasonal events or special occasions. Faceplates are easily removed for cleaning the Faceplate or re decorating the wall.

Another object is to provide Faceplate plugs which fill unused switch apertures, whether if attaching to a single or double outlet box, for a smooth surface area for applying a decorating material.

Other objects and advantages of the present invention will become apparent from the following descriptions, taken in connection with the accompanying drawings, wherein, by way of illustration and example, an embodiment of the present invention is disclosed.

An article of manufacture for a Cover plate and a Faceplate for flush mounted Electrical Outlet Boxes, installed with various types of Switches and or Outlet Receptacles or combinations thereof.

The Cover plate will position over single, double or triple electrical outlet boxes attached to the switch or outlet with screws, and adjusting apertures which secure flush to the wall when the cover plate is attached.

The Faceplate being over sized has ample surface area for attaching a graphic cover or applying material for decoration without distracting frontal screws. The Faceplate is attached to the Cover plate with hook and latch material for easy installation and removal, cleaning, or exchanging Faceplates with other designs for seasonal or other occasions.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF DRAWINGS

FIG. 1 is an exploded view of the invention attached to a single electrical outlet box, installed with a single electrical switch.

FIG. 2 is an exploded view of the invention attached to a single electrical outlet box, installed with a single outlet receptacle.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1. A standard single electrical outlet box 14 displayed with an electric switch 16 attached with screws 40, installed flush to the wall 20 which is common and standard in building construction.

The oversized Cover plate 22 composed of galvanized sheet metal, having three horizontal aligned switch apertures 24. 26. 28 there through with two each vertically aligned mounting holes 30. 32. 34 and two each vertically aligned adjusting apertures 42. 44. 46, are shaped to correspond and position over the switch 16, and outlet box 14, covering exposed wiring, displayed in the center position using switch aperture 26, mounting holes 32 and adjusting apertures 44.

The Cover plate 22 is attached at the switch threaded openings 18 using mounting screws 38, whereas the switch 16 and the Cover plate 22 is secured flush to the wall 20 by adjusting the switch mounting screws 40.

The Cover plate 22 may utilize the left switch aperture 24, mounting holes 30, and adjusting apertures 42, or the right switch aperture 28, mounting holes 34, and adjusting apertures 46. The Cover plate 22 may also be attached to a double, or triple outlet box installed with switches 16.

The oversized Faceplate 54 with out frontal screws, composed of injected molded plastic for a decorative covering or stamped metal for an enamel finish, having three horizontal aligned switch apertures 56. 58. 60, is attached to the cover plate 22, with sticky back hook 50 and loop 52 material.

The sticky back protective paper 48 is removed from the hook material 50 and latch material 52 and the hook material 50 is attached to both sides of aperture 26 of the Cover plate 22. The loop material 52 is attached to corresponding sides of aperture 58 of the Faceplate 54.

The hook 50 and the latch 52 material attaches the Faceplate 54 to the Cover plate 22, for easy removal to clean or exchanging decorative Faceplates.

Turning next to FIG. 2. A standard single electrical outlet box 14 displayed with an outlet receptacle 64 attached with screws 40, installed flush to the wall 20 which is common and standard in building construction.

The Cover plate 22 varies from FIG. 1 in that the center switch aperture 26 is replaced with outlet receptacle apertures 66 and mounting hole 36.

The Cover plate 22 is attached at the outlet receptacle threaded opening 18, using mounting screw 38. Whereas the outlet receptacle 64 and the Cover plate 22 is secured flush to the wall 20 by adjusting the outlet receptacle mounting screws 40.

The Cover plate 22 may also be attached to a double, or triple outlet box installed with an outlet receptacle 64 and a switch or switches 16.

The Faceplate 54 varies from FIG. 1 in that the center switch aperture 58 is replaced with outlet receptacle apertures 68.

The method for attaching the Faceplate 54 to the Cover plate 22 is the same as described for FIG. 1.

What is claimed is:

1. An article of manufacture for a cover plate and a faceplate without frontal screws for flush mounted electrical outlet boxes comprising:

an oversized cover plate, composed of galvanized sheet metal having a plurality of horizontal aligned apertures for switches and receptacles with vertically aligned top and bottom mounting holes for switches and receptacles, and vertically aligned shaped adjusting apertures above said top mounting holes and below said bottom mounting holes, said cover plate manufactured with shaped corresponding apertures to be used with various types of switches, outlet receptacles or combinations of said switches and outlet receptacles; and said cover plate with said vertically aligned shaped adjusting apertures having the advantages of being able to secure said cover plate flush to a wall, and to cover exposed wiring, and to correct any defects that may have occurred when the outlet boxes were installed; and an oversized faceplate for applying a decorative covering, said faceplate having a plurality of apertures that correspond to said apertures of said switches and outlet receptacles; and the faceplate, without frontal attaching screws is attached to the cover plate by using sticky back hook and loop material for easy installation and removal; and a plurality of faceplate plugs, which fill unused ones of said switch apertures or receptacle apertures and provide a smooth surface area for applying a decorating material.

* * * * *